US009871660B2

(12) United States Patent
Terborg Del Rosal et al.

(10) Patent No.: US 9,871,660 B2
(45) Date of Patent: Jan. 16, 2018

(54) METHOD FOR CERTIFYING AND AUTHENTIFYING SECURITY DOCUMENTS BASED ON A MEASURE OF THE RELATIVE VARIATIONS OF THE DIFFERENT PROCESSES INVOLVED IN ITS MANUFACTURE

(71) Applicant: BANCO DE MEXICO, Distrito Federal (MX)

(72) Inventors: Heinrich Fidencio Terborg Del Rosal, Distrito Federal (MX); Ernesto Gonzalez Candela, Distrito Federal (MX); Monica Lopez Gonzalez, Distrito Federal (MX)

(73) Assignee: BANCO DE MEXICO, Distrito Federal (MX)

( * ) Notice: Subject to any disclaimer, the term of this patent is extended or adjusted under 35 U.S.C. 154(b) by 67 days.

(21) Appl. No.: 14/581,984

(22) Filed: Dec. 23, 2014

(65) Prior Publication Data
US 2016/0182239 A1    Jun. 23, 2016

(51) Int. Cl.
*H04N 1/32* (2006.01)
*H04L 9/32* (2006.01)
(Continued)

(52) U.S. Cl.
CPC ........... *H04L 9/3263* (2013.01); *G07D 7/004* (2013.01); *G07D 7/2033* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,454,610 A | * | 6/1984 | Sziklai | G07C 9/00063 235/380 |
| 4,853,968 A | * | 8/1989 | Berkin | G06K 9/6203 348/87 |

(Continued)

FOREIGN PATENT DOCUMENTS

| | | |
|---|---|---|
| GB | 2 417 707 A | 3/2006 |
| WO | 01/91007 A1 | 11/2001 |
| WO | 2009/149408 A2 | 12/2009 |

OTHER PUBLICATIONS

Hayes Jim, VDV Works, "Understanding Wavelengths in Fiber Optics", The Fiber Optic Association—Tech Topics, found at https://web.archive.org/web/20120607063224/http://www.thefoa.org/tech/wavelength.htm, Jul. 2012.*

(Continued)

*Primary Examiner* — Peter Poltorak
(74) *Attorney, Agent, or Firm* — MH2 Technology Law Group LLP

(57) ABSTRACT

Methods for certifying a security document comprising the steps of: a) selecting a set of unique characteristics, obtained as the result of the variations in the manufacturing process and supplies, b) getting a digital image of a security document and obtaining data of the relative position between features selected from different manufacturing processes (register), c) constructing a message by measuring the register of selected features from the document and the document ID data, d) constructing a hashed message, the hashed message being the message obtained after being encoded by means of a unidirectional cryptographic hash function, e) encrypting the hashed message using a public key cryptographic system to obtain a digital certificate by means of a private key, and f) storing the digital certificate in an external database.

7 Claims, 5 Drawing Sheets

(51) Int. Cl.
*G07D 7/004* (2016.01)
*G07D 7/2033* (2016.01)
*G07D 7/12* (2016.01)

(52) U.S. Cl.
CPC ........ *H04L 9/3236* (2013.01); *H04N 1/32149* (2013.01); *H04N 1/32352* (2013.01); *G07D 7/12* (2013.01)

(56) References Cited

U.S. PATENT DOCUMENTS

| | | | | |
|---|---|---|---|---|
| 4,973,851 | A * | 11/1990 | Lee | G07D 7/04 250/556 |
| 5,521,984 | A * | 5/1996 | Denenberg | G06K 9/00134 382/100 |
| 5,790,693 | A * | 8/1998 | Graves | B65H 3/063 382/135 |
| 5,898,779 | A * | 4/1999 | Squilla | H04N 1/32128 380/200 |
| 6,021,202 | A * | 2/2000 | Anderson | G06F 17/24 705/18 |
| 6,053,405 | A * | 4/2000 | Irwin, Jr. | A63F 3/0665 235/375 |
| 6,122,403 | A * | 9/2000 | Rhoads | G06F 17/30876 382/233 |
| 6,285,776 | B1 * | 9/2001 | Rhoads | G06T 1/0021 380/51 |
| 6,491,215 | B1 * | 12/2002 | Irwin, Jr. | A63F 3/0665 235/375 |
| 6,557,102 | B1 * | 4/2003 | Wong | G06F 21/00 705/3 |
| 7,222,791 | B2 * | 5/2007 | Heilper | G06Q 30/06 235/385 |
| 7,364,091 | B2 * | 4/2008 | Streeter | A63F 3/0685 235/375 |
| 7,669,245 | B2 * | 2/2010 | Jung | G06F 21/6227 705/51 |
| 7,710,769 | B2 | 5/2010 | Cowburn et al. | |
| 7,710,770 | B2 | 5/2010 | Cowburn et al. | |
| 7,812,935 | B2 | 10/2010 | Cowburn et al. | |
| 7,853,792 | B2 | 12/2010 | Cowburn | |
| 7,995,196 | B1 * | 8/2011 | Fraser | G06K 9/00577 356/71 |
| 8,078,875 | B2 | 12/2011 | Cowburn et al. | |
| 8,103,046 | B2 | 1/2012 | Cowburn | |
| 8,125,697 | B2 | 2/2012 | Massicot et al. | |
| 8,345,076 | B2 | 1/2013 | Massicot et al. | |
| 8,345,315 | B2 | 1/2013 | Sagan et al. | |
| 8,392,715 | B2 | 3/2013 | Massicot et al. | |
| 8,421,625 | B2 | 4/2013 | Cowburn | |
| 8,448,865 | B2 | 5/2013 | Picard et al. | |
| 8,471,880 | B2 | 6/2013 | Audouard et al. | |
| 8,472,677 | B2 | 6/2013 | Sagan et al. | |
| 8,498,022 | B2 | 7/2013 | Massicot et al. | |
| 8,502,668 | B2 | 8/2013 | Cowburn | |
| 8,593,696 | B2 | 11/2013 | Picard et al. | |
| 8,612,763 | B1 * | 12/2013 | Axel | G06F 21/32 380/30 |
| 8,615,475 | B2 | 12/2013 | Cowburn | |
| 8,638,476 | B2 | 1/2014 | Massicot et al. | |
| 8,682,076 | B2 | 3/2014 | Cowburn et al. | |
| 8,699,088 | B2 | 4/2014 | Cowburn | |
| 8,727,222 | B1 | 5/2014 | Picard et al. | |
| 8,736,910 | B2 | 5/2014 | Sagan et al. | |
| 8,749,386 | B2 | 6/2014 | Cowburn | |
| 8,757,493 | B2 | 6/2014 | Cowburn | |
| 8,766,800 | B2 | 7/2014 | Cowburn | |
| 8,892,556 | B2 | 11/2014 | Cowburn et al. | |
| 2001/0002213 | A1 * | 5/2001 | Powell | G06Q 20/341 382/100 |
| 2001/0037454 | A1 * | 11/2001 | Botti | G06F 21/64 713/176 |
| 2001/0044783 | A1 * | 11/2001 | Weisberg | G06Q 20/0855 705/62 |
| 2002/0010627 | A1 * | 1/2002 | Lerat | G06Q 30/02 705/14.26 |
| 2002/0065786 | A1 * | 5/2002 | Martens | G06Q 20/042 705/70 |
| 2003/0044043 | A1 * | 3/2003 | Kaneda | G06T 1/0028 382/100 |
| 2003/0061487 | A1 * | 3/2003 | Angelo | G06F 21/565 713/176 |
| 2003/0063772 | A1 * | 4/2003 | Smith | G07D 7/004 382/100 |
| 2003/0211296 | A1 * | 11/2003 | Jones | B32B 38/145 428/195.1 |
| 2003/0219145 | A1 * | 11/2003 | Smith | G06K 9/00577 382/100 |
| 2003/0231785 | A1 * | 12/2003 | Rhoads | G06F 17/30876 382/100 |
| 2004/0039914 | A1 * | 2/2004 | Barr | G06T 1/0028 713/176 |
| 2004/0060978 | A1 * | 4/2004 | Okamoto | G06Q 20/042 235/375 |
| 2004/0153649 | A1 * | 8/2004 | Rhoads | G06F 17/241 713/176 |
| 2004/0268130 | A1 | 12/2004 | Pretorius | |
| 2005/0091261 | A1 * | 4/2005 | Wu | G06F 21/64 |
| 2005/0132194 | A1 * | 6/2005 | Ward | G06Q 20/341 713/176 |
| 2005/0138382 | A1 * | 6/2005 | Hougaard | G06Q 10/10 713/176 |
| 2005/0258234 | A1 * | 11/2005 | Silverbrook | G06Q 10/087 235/379 |
| 2006/0098241 | A1 * | 5/2006 | Cheong | G06K 7/14 358/463 |
| 2007/0061582 | A1 * | 3/2007 | Ohmori | H04K 1/00 713/176 |
| 2007/0204755 | A1 * | 9/2007 | Moreau | B41F 11/02 101/41 |
| 2008/0030798 | A1 * | 2/2008 | O'Neil | G07D 7/2016 358/448 |
| 2008/0112615 | A1 * | 5/2008 | Obrea | G07D 7/2033 382/169 |
| 2008/0260199 | A1 * | 10/2008 | Cowburn | G06K 9/00577 382/100 |
| 2009/0087076 | A1 * | 4/2009 | Jenrick | G07D 7/00 382/135 |
| 2009/0136079 | A1 * | 5/2009 | Stierman | G07D 7/12 382/100 |
| 2009/0303000 | A1 * | 12/2009 | Cowburn | G07D 7/2033 340/5.86 |
| 2009/0322019 | A1 * | 12/2009 | Gudenburr | G07D 7/12 271/302 |
| 2010/0027851 | A1 * | 2/2010 | Walther | G06K 5/00 382/112 |
| 2010/0060942 | A1 * | 3/2010 | Monga | G06K 1/121 358/3.28 |
| 2010/0157318 | A1 * | 6/2010 | Ming | G07D 7/2025 358/1.1 |
| 2011/0096955 | A1 * | 4/2011 | Voloshynovskiy | G06K 9/00 382/103 |
| 2011/0145584 | A1 * | 6/2011 | Coburn | G06F 21/602 713/176 |
| 2011/0283369 | A1 * | 11/2011 | Green | G06K 19/10 726/30 |
| 2012/0045100 | A1 * | 2/2012 | Ishigami | G06T 7/55 382/106 |
| 2012/0168506 | A1 * | 7/2012 | Ruehrmair | G06F 21/73 235/454 |
| 2012/0229872 | A1 * | 9/2012 | Dolev | G06F 21/64 358/448 |
| 2013/0022238 | A1 * | 1/2013 | Wood | G07D 7/2033 382/103 |
| 2013/0097493 | A1 * | 4/2013 | Boyer | H04L 9/3236 715/268 |
| 2013/0200606 | A1 * | 8/2013 | Omar | B41M 3/14 283/74 |
| 2013/0318345 | A1 * | 11/2013 | Hengeveld | H04L 12/4633 713/168 |

(56) References Cited

U.S. PATENT DOCUMENTS

| | | | | |
|---|---|---|---|---|
| 2013/0325943 A1* | 12/2013 | Al-Harthi | ............... | G06Q 50/01 709/204 |
| 2014/0119615 A1* | 5/2014 | Mercolino | ............. | G07D 7/004 382/112 |
| 2015/0012339 A1* | 1/2015 | Onischuk | ............... | G07C 13/00 705/12 |

OTHER PUBLICATIONS

Stallings (William Stallings, "Cryptography and network security", 2th edition, 1998, ISBN: 0138690170.*
International Search Report dated Aug. 12, 2015 from corresponding International Application No. PCT/IB2014/002906; 4 pgs.

* cited by examiner

METHOD FOR CERTIFYING AND AUTHENTIFYING SECURITY DOCUMENTS BASED ON A MEASURE OF THE RELATIVE VARIATIONS OF THE DIFFERENT PROCESSES INVOLVED IN ITS MANUFACTURE

FIELD OF THE INVENTION

This description generally relates to a process for the certification and authentication of security documents. Specifically, it refers to the utilization of the security features and unique characteristics which are already present in the security documents in order to certify and authenticate this kind of documents. More particularly, it relates to the certification and authentication of banknotes, checks or any other security documents by means of utilizing the natural variations during the production process; which is when the printing processes, the security features and other characteristics are incorporated into the document.

BACKGROUND OF THE INVENTION

Due to the remarkable advance in existing technologies for graphical reproduction that are commonly available on the market, the occurrence of counterfeits of good quality of security documents such as checks, banknotes, etc. are becoming common. Therefore, a certification and authentication method for security documents using methods that can withstand the technological advance of graphic equipment, and that makes use of commonly available devices such scanners or digital cameras, is of utmost importance.

Moreover, organized crime has found a way to use these professional technologies to produce large volumes of high-quality counterfeits; this fact jeopardizes the trust that society has in the issuing institution and the institution's ability to provide reliable instruments to detect counterfeits.

The commonly known authentication methods focused on verification based on devices or automatic equipment rely on processes and systems that require equipment with specific characteristics to verify the authenticity of one security feature of the document, where the difficulty is imposed either by a high cost of the equipment or the special material that is required. Examples are the inclusion of magnetic materials, UV fluorescent inks, infrared absorbing pigments, systems of dynamical optical response such as phosphorescence decay, magnetic bands and holograms which are included in security documents. Unfortunately, criminals are also using methods that are becoming more sophisticated, and with the help of modern ease of access to information and reproduction media, it is possible to imitate almost any security feature that manufacturers have incorporated into the documents by means of commercially available materials and equipment. The counterfeit of documents can include counterfeits based on systems using laser or inkjet printers (photocopy type counterfeits) and counterfeits using processes and materials similar to the genuine (counterfeits by process). In the case of photocopy type counterfeits, the central banks include special features that printers cannot imitate: for example, watermarks, magnetic threads, transparent windows, engraved reliefs with tactile properties, holograms and optically variable features and inks that change with the viewing angle. In the case of a counterfeits by process, the authenticity is difficult to determine by simple examination from a non-trained user. In addition, for the particular case of money counterfeiting, this has a high impact in the finances of a nation. Actually, the efforts to counteract such counterfeits are focused on the materials and inks to be used in the manufacture of new security documents, trying to foresee which of them will have a high risk of becoming commercially available during the intended lifetime of the document in order to avoid them. In general, the standard approach requires predicting when the gap between commercially available technologies and those intended for security documents is closing due to the inevitable technological progress.

In the case of currencies such as U. S. Dollars and Euros which are used in many countries, the risk of counterfeiting increases as there opens an opportunity to criminals of those countries, including state-sponsored criminal organizations.

Therefore, it is desirable that the authenticity of a security document does not only rely on the fact that the genuine materials and processes are difficult, however not impossible, to counterfeit; but also on mathematically proven security such as a digital certificate.

On the other hand, in the case of banknotes, which are extensively used for everyday transactions, it is necessary to be able to immediately determine their authenticity. As an example, if a person, during a transaction, fails to detect a counterfeit, this will result in a loss since he will receive a document with no value, deliver a valuable merchandise, and in some cases provide the change in cash when the value of the merchandise is lower than the value of the counterfeit. Thus, there is a requirement of being able to quickly authenticate security documents such as checks and banknotes to prevent the entrance of such forged documents into the national economy that affects the general public, and to keep trust in the issuing institutions.

Forensic tests are very accurate in determining whether a document is genuine or not; however, the processing time for one document is very large, and they usually require expensive and specialized equipment. On the other hand, computers and gadgets with constantly growing image acquisition quality and computing capacity are becoming more popular and more economically accessible to individuals and corporations. Thus, it would be desirable to authenticate security documents by the use of currently available technology for digital image acquisition in devices like smart phones or scanners connected to computers which can analyze data to check the authenticity of a security document, particularly in the case of banknotes.

It has also been recognized in the field of security documents testing that a balance must be struck between the conflicting goals of "acceptance" and "rejection", positive acceptance being the ability to correctly authenticate—identify and accept—all genuine security documents no matter their condition, and positive rejection being the ability to correctly discriminate and reject all non-genuine security documents. However, there is a possibility of negative acceptance, wherein a non-genuine document is accepted as genuine; and negative rejection, wherein a genuine document is considered as a counterfeit and rejected. It is necessary for the authentication process to have a high level of accuracy regarding these definitions, thus avoiding negative acceptances and negative rejections.

U. S. Patent Application No. 2004/0268130 discloses a system and method of authenticating an article that includes the steps of selecting an inherent feature of the article, and converting the feature into digital data to form an identification code for the article. An encryption system is used to encrypt the identification code, utilizing a secret private key of an asymmetric encryption key pair, and associated with the issuing party. The encrypted code is made available on a label accompanying the article. During a subsequent phase and at an authentication station, digital data relating to the feature is determined directly from the article and the code is decrypted utilizing a public key of the pair obtained from a third party in accordance with rules of a public key infrastructure. According to the system and method of U. S. Patent Application No. 2004/0268130, the inherent feature is the result of a chemical manipulation of the article or the inclusion of unique characteristics in or on the article. It also requires that the encrypted code is available on a label accompanying the article; however, the code is encrypted without applying a hash function. This flaw will allow a counterfeiter to obtain the original data that defines the uniqueness of the article and to start making modifications in order to approach the original data. By using a hash function, the counterfeiter will have no information on how to modify the article to try to make it pass the authentication. Moreover, it is not clear whether the chosen characteristics will be able to withstand the natural deterioration from the use of the articles.

Advanced Track and Trace (ATT) has developed a method to certify printing plates, and their correspondingly printed banknotes. It uses robust cryptographic methods. However, it has a main drawback: the fact that the number of codes is restricted to the plates designed for the manufacture of banknotes using the ATT process; one can only reproduce the serials that were printed with the same plate, due to cryptographic protection. In addition, due to the complexity of the pattern that has to be printed, it requires a microscope or some augmenting device as well as an improved quality control, in order to minimize the variations of batches of security banknotes.

As can be noticed, there is a need for a method to certify security documents as well as a trustable and quick process for authenticating documents. In addition, with the always-increasing development in information technology, this method adds to the security and confidence in a physical security document with a digital certificate counterpart on the understanding that both are needed to assess the validity of the document. Particularly, in this scenario, considering that the physical document and the digital certificate are uniquely linked together, a banknote without a valid digital certificate will be of no value even though the document is genuine.

SUMMARY

Aspects of the present disclosure provide a system of certification of banknotes, checks or any other security document. Aspects comprise the digital certification of the documents involving these variations, which imply the uniqueness of each piece. This is possible due to the natural variability of industrial production processes, as well as the information that changes in a predictable and controlled manner, such as: serial numbers, serial character, etc.

In aspects, a certification process of documents that consist of a hashed message that, even if decrypted, is only useful to check the authenticity of the document, and will not disclose any information about the characteristics of the original document that could be useful in the process of forgery.

Another aspect provides an authentication process for banknotes, checks or any other security documents.

Another aspect provides an authentication method to be conducted in an automated way.

Another aspect provides a method for positive identification of counterfeited security documents with a low incidence of false negative and false positive authentication.

Yet another aspect is to classify counterfeits by their quality and degree of sophistication.

In some aspects, the data to individualize every security document which is obtained from a set of characteristics from the register variations between features added in different manufacturing processes. These characteristics are related to the particularity and even the uniqueness of each security document.

The creation of a different message for each security document using the previously mentioned set of characteristics and the data related to the document ID data.

Further, in some aspects, a method of certification and authentication of any security document is based on the message described above, requiring a register variation which is the result of at least two production processes, the method of certification comprising the steps of:

selecting a set of unique characteristics, obtained as a result of the variations in the manufacturing process and supplies, Getting a digital image of a security document and obtaining the data, constructing a message by measuring the register differences between features from the document and the data related to the document ID data, constructing a hashed message, the hashed message being the message obtained after the original message is codified by means of a unidirectional cryptographic hash function, encrypting the hashed message using a public key cryptographic system to obtain a digital certificate by means of a private key, and storing the digital certificate in an external database and/or marking or printing the digital certificate in the security document.

According to other aspects, a method of authentication is provided, comprising the steps of:

providing a security document to be authenticated, verifying that the security raw materials and manufacturing processes are present in the security document by means of well known image analysis techniques or by other kind of traditional verification, constructing the correspondent message by measuring the register differences between features from the document and the data related to the document ID data, applying a hash function to obtain a hashed message for verification, obtaining the certified hashed message; in some aspects, the certified hashed message is obtained from the digital certificate marked or printed on the security document, and the digital certificate is decrypted through the use of a public key to render a hashed message for reference; in some aspects, the certified hashed message is obtained from a database by accessing the database, authenticating the document by comparing the certified hashed message and the hashed message for verification, where if the certified hashed message and the hashed message for verification coincide, the document is considered as genuine, and if the certified hashed message and the hashed message for verification do not coincide, the document is considered as counterfeit.

DETAILED DESCRIPTION

Figure 1:
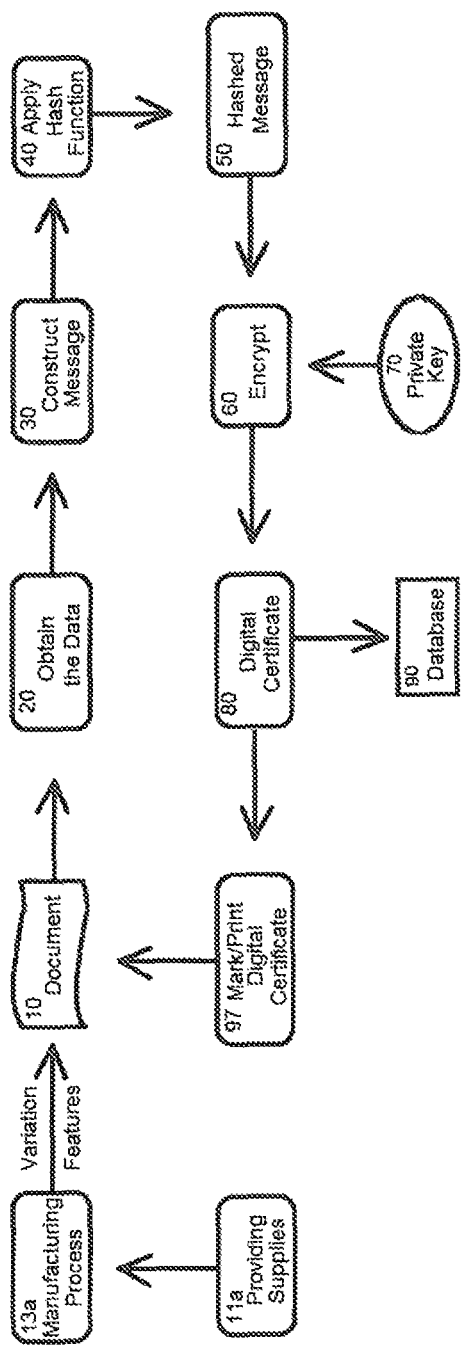
FIG. 1 shows the general certifying process.

The certification and authentication process is based on the variations which take place during the steps of the manufacturing process of the security documents, and particularly in the interaction of those steps.

Some aspects are related to a system for certification and authentication of security documents.

Some aspects also relate to a method for certification and authentication of an original document, wherein the unique characteristics of every document are identified, codified and optionally inserted in the security document itself, or stored in an external database. This method and proposed system prevents falsification of security documents.

Aspects of the present disclosure will become more fully understood from the detailed description given herein below and the accompanying drawings which are given by way of illustration only, and thus, are not limits of the present invention, and wherein:

In the present disclosure, the following terms have the meaning indicated.

Certification—Formal procedure by which an accredited or authorized person or agency assesses (and attests in writing by issuing a certificate) the attributes, characteristics, quality, qualification, or status of individuals or organizations, goods or services, procedures or processes, or events or situations, in accordance with established requirements or standards.

Authentication—the act of confirming the truth of an attribute of a single piece of data (datum) or entity. Authentication is the process of determining whether someone or something is, in fact, who or what it is declared to be.

Security Printing Process—Special printing processes that commercially available processes cannot easily imitate; for example, those used in the printing of banknotes.

Security Features—refers to the security characteristics present in the security document. Such characteristics are intended to be difficult to imitate through the use of commercially available products as is the case of security paper, security inks, watermarks, magnetic threads, transparent window, tactile features, foils, patches, holograms, etc.

Security Documents—is a document that states in writing some guaranty (of each of the Guarantors), and was produced using a security printing processes and may also include security features.

Unique Characteristics—the characteristics from the natural register variations between features added in different manufacturing processes. These characteristics are related to the particularity and even the uniqueness of each manufactured security document. The characteristics can be acoustic, electric, or magnetic signals and can be measured on a part of the electromagnetic spectrum. It includes print errors or printing variations: random ink stains, unfilled lines, color, etc.

Register—the register refers to the relative position, alignment or misalignment, between the features of a security document, and which were included by the different manufacturing processes. During the manufacture of a security document, the relative position between the variety of images or characters or security features from different processes varies from document to document, making the document unique and unrepeatable due to such variations.

Metric Function—A metric on a set X is a function (called the distance function or simply distance)

d: X×X→R, where R is the set of real numbers). For all x, y, z in X, this function is required to satisfy the following conditions:

$$d(x,y) \geq 0 \qquad 1.$$

$$d(x,y) = 0 \text{ if and only if } x=y \qquad 2.$$

$$d(x,y) = d(y,x) \qquad 3.$$

$$d(x,z) \leq d(x,y) + d(y,z). \qquad 4.$$

Generalized Metric Function—A generalized metric on a set X is like a metric function, but in some way of relaxing its axioms (for example, maybe only satisfy the axioms 1 and 3).

Document ID Data—the data that act like an identifier for a particular document. They can be words, numbers, letters, symbols, or any combination of these. An identifier is a name that identifies (that is, labels the identity of) either a unique document or a set of documents. The abbreviation ID refers to identifier (that is, an instance of identification). In the case of banknotes, it contains the serial number.

The Message—the concatenation of the outcome from applying some metrics, generalized metrics or other functions to the points in a previously selected subset of unique characteristics (of the security document register) and its document ID data.

The Hashed Message—the codified message by means of an unidirectional cryptographic hash function.

Digital Certificate—the encrypted hashed message stored in the process of certification (encrypted using a private key).

The term "unique characteristics" is in use for all those natural variations of the document that arise in the manufacturing process and that are measurable; in particular, those provided by the security printing process for the fabrication of a security document. An example of a unique characteristic is the register.

According to aspects of the present disclosure, the security features are those parts or components which are present in a security document, having the purpose of facilitating to the different users of the document the authentication of the document by way of controlling the manufacturing process, distribution and commercialization, making it possible to prevent the acquisition of the security feature and falsification by an unauthorized individual or entity.

According to aspects of the present disclosure, the unique characteristics are those natural variations which are measurable along the manufacturing process.

Also disclosed is a method for digitally certifying a security document through the data obtained from the unique characteristics, in particular the register.

In one aspect, a method is provided for digitally certifying security documents using security features and unique characteristics which are already present in mentioned document.

Particularly, the document will be digitalized, which can be done through a scanner or digital photography using different sources and kinds of illumination, as well as any other measurement of physical, chemical, or physicochemical properties of the document from which the unique characteristics can be obtained. Particularly, using visible light and a device to digitalize the image of the document, the register can be measured.

According to aspects of the present disclosure by "taking an image", it must be understood that the scanning and digitalization equipment measures features such as:

reflection, transmission, absorption, emission properties, in any wavelength of the electromagnetic spectrum, or combination thereof either with stationary illumination or in a pulsating state.

magnetic and/or electric properties, p.e. electromagnetic digital fingerprints of the materials constituting the security document;

acoustic properties; the paper, when subject to cycles of stress of a particular magnitude, produces particular measurable levels of noise;

properties in response to a mechanical and/or chemical and/or electrical stimulation of the paper or security features.

The features to be measured strongly depend on the nature of the manufacturing process employed during the manufacture of the security document, as well as the use that will be given to the document.

A message is constructed using some features as well as the mathematical correlation between them. According to aspects of the present disclosure, a metric function, which is a function of a distance between two points, is used.

The message is constructed using those features which cannot be degraded or whose degradation is known and/or predictable:

Multiple zones of different sizes and/or the whole document;

The features to be measured depend on the document and the manufacturing process for obtaining thereof;

The features that depend on the interaction between at least two different processes.

In the particular case of obtaining features from digital images, under any illumination, the image is taken emphasizing those parts which are intended to be certified. For example, it could be of interest to certify only a half or quarter size of the security document, or to create multiple certifications using different messages for a single document.

The system of certification and authentication of is disclosed with reference to the figures.

The manufacturing process of the security document according to aspects of the present disclosure comprises:
  a) Providing suitable supplies (step 11a) which include the substrate, inks, security features such as watermarks, threads, transparent windows, colored fibers, foils or patches, etc.
  b) Conducting the manufacturing process of the security document (step 13a), which involves the integration of all the supplies, the process comprising: placing a variety of features, characters or images on the substrate using at least two different manufacturing processes; and marking or placing the serial number of the document or any other document ID data;
  c) Certifying the security document by:
    i. obtaining a digital image of the document (step 10) and obtaining the data (20) corresponding to a selected group of unique characteristics for every document and the document ID data. These unique characteristics are a result of the manufacturing process variations and the supplies used;
    ii. constructing a message (30) by using a metric function for determining the relative position of the points previously selected as a group of unique characteristics, as well as the document ID data;
    iii. constructing a hashed message by applying a hash function (40), the hashed message (50) being the message obtained by means of applying an unidirectional cryptographic hash function;
    iv. Encrypting by means of a public key cryptography system (60) the hashed message using a private key (70) to obtain a digital certificate (80), and
    v. storing the digital certificate in a database (90) and/or,
    vi. marking or printing (97) the digital certificate on the security document (10).

Figure 2:
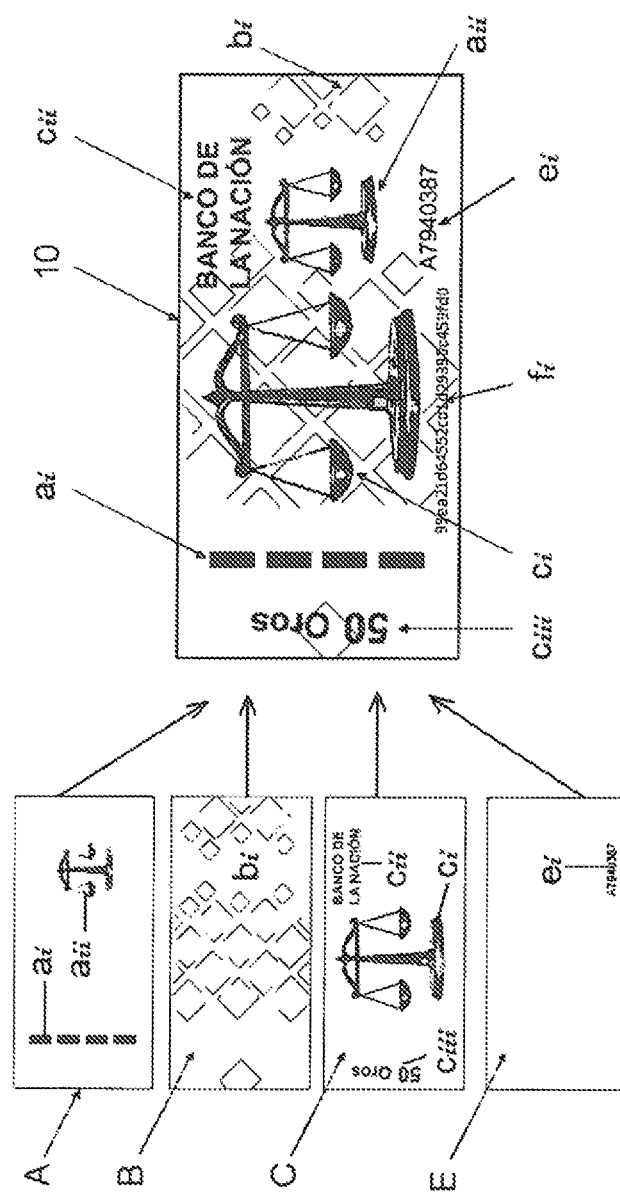
FIG. 2 shows a security document containing images and characters from different processes.

In FIG. 2 a security document is depicted according to aspects of the present disclosure. For the manufacture of the security document, some processes are involved; as an example, four processes (A, B, C, E) are shown. The security document includes a variety of images and characters belonging to different manufacturing processes. In the case of the FIG. 2, Process A provides the initial substrate for a security document, the substrate including some security features such as a thread or foil (ai) and a watermark or electrotype image (aii). Process B provides a set of images (bi), for example in the form of offset printing. Process C provides the security document with an image (ci) and also characters (ciii), in the example referring to the denomination, and character (cii) referring to the name of the issuing institution; as an example, this could be an engraving process. Likewise, process E provides the serial number of the security document (e1), exemplified as a banknote. In some aspects, the security document is certified according to the process depicted in FIG. 1; as a result, the digital certificate obtained by the certification process can optionally be printed on the security document as feature (fi).

According to aspects of the present disclosure, at least one of the following unique characteristics of the document is considered for certifying the document, and they are obtained from:

Electromagnetic response (IR, Visible, UV),
Register
number and position of fluorescent fibers
printing errors or printing variations: random ink stains, unfilled lines, color, etc.
Physical properties,
Acoustic properties,
Electric properties,
Magnetic properties,
etc.

and require at least one document ID data:
serial number,
document denomination,
names,
dates, etc.

FIG. 1 discloses the certification process according to aspects of the present disclosure; a security document is manufactured according to the well known processes of the prior art (Step 10), including the steps of providing special supplies 11a, manufacturing a substrate 13a, and conducting a manufacturing process comprising a variety of steps (13a).

The document thus manufactured, it is then subjected to the process of obtaining data (step 20), FIG. 1 in order to obtain the particular data of each manufactured item, and in particular, the information concerning the relative positions between the variety of characters or images present in a security document.

Figure 3:
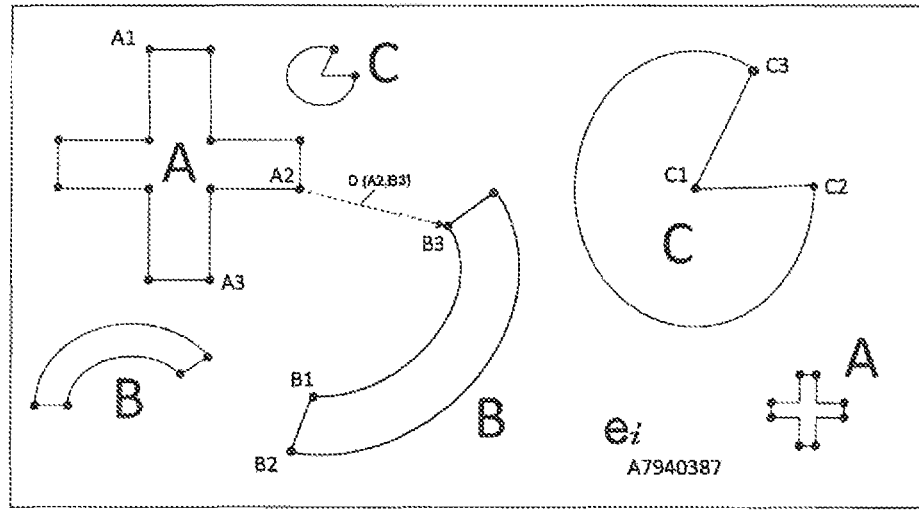
FIG. 3 shows an example of a security document having different images from different processes and showing reference points and relative points.

The data from the relative position of the images and characters present in a security document are used to construct a numeric message. FIG. 3 depicts the way to obtain the data from the security document. The message (30) obtained in step (20) consists of data concerning the relative positions between images and characters, whose positions depend on the process by which such images and characters are placed on the security document. For example, in FIG. 3, a security document is represented containing images produced by a sequence of process A, B, C and E. As noted, there is a defined set of reference points (A1, A2, . . . , AN), (B1, B2, . . . , BN), (C1, C2, . . . , CN), (E1, E2, . . . , EN) etc. for each image or process, in a defined random position providing an easy access or identification, for example certain corners of an image, some marked dots, etc. and then a first relative position [D1(A1,A2)] of a first relative point (A2) is calculated in image A with respect to reference point A1; a second relative position [D2(A1,B1)] of relative point B1 is calculated in image B with respect to reference point A1. In the same way, there is calculated a third relative position [D3(A1,C1)] of relative point C1 in image C; and optionally, a fourth relative position [D4(A1,E1)] of a relative point (E1) in image D is calculated as well. In some aspects, there are also calculated other relative positions, taking as reference a second reference point in image B (B2), a third reference point in character C (C2) or a fourth reference position in character E (E2). The metrics are also calculated for each relative position from each reference point as well as other trigonometric values and other mathematical quantities associated with the distance between the points. Thus, there can be defined a variety of reference points and a variety of measurements.

Figure 4:
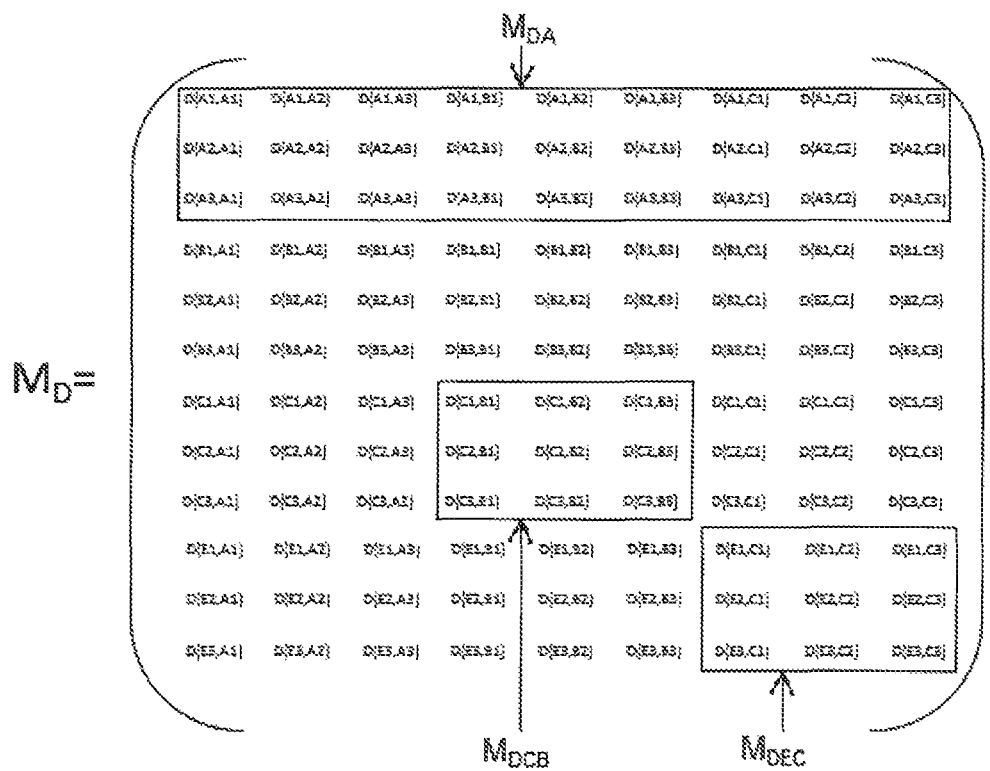
FIG. 4 is an example of a function $M_D$ for the mathematical treatment of data to obtain a message.

The security document data is then associated with a mathematical function, such as a mathematical matrix as depicted in FIG. 4 which conforms the "Message" of the security document. As noted, it is possible to construct one general security message $M_D$ for all the features measured, or it is also possible to construct a variety of messages coming from specific parts of the security document, for example the Messages $M_{DA}$ referring to relative position of the dot A with respect to the remaining dots A, B, C and E, or a Message $M_{DCB}$ related to the relative position between dots C and B, or Message $M_{DEC}$ concerning to the relative position of dots from figures C and E. This is particularly useful when it is desirable to authenticate a document where only part of the document is available, for example in case of document fractions, or torn security documents.

There are some mathematical methods in the previous art to obtain a message from the information collected. For example, the protocol that follows the value of the relative positions, or a mathematical regression, for example a linear regression, a logarithmic regression or other kind of mathematical regression. In some aspects, it is preferred to use a metric function.

In order to obtain the variety of the reference points and the relative positions, a process of digitalization or capture of an image is conducted, for example with, digital photography or a scanner; as well as any other physical and/or chemical measurements of unique characteristics for every document, for example paper type, paper weight, paper texture, paper color, ink type, ink color, etc. The digitalization step could be conducted in a digitalization module subsequent to the manufacture (13a).

As an example, when the subset of unique characteristics arise from the register between the different processes involved in the manufacture of the security document, then variations between the images and characters result considering the process A, B, C and E will result in the order of some quintillions depending on the resolution of the digital image of the document.

|  | Minimum number of Combinations at | | |
|---|---|---|---|
|  | 100 dpi | 200 dpi | 600 dpi |
| Process' Variations | 8.3E+08 | 2.1E+11 | 1.4E+15 |
| Total including document ID data | 1.7E+17 | 4.3E+19 | 2.8E+23 |

As noted, the level of variation provides a unique and unrepeatable way to identify documents, whose exact reproduction is extremely complex even for the original manufacturer.

Moreover, if not only the register but also other unique characteristics such as the number and position of colored or fluorescent fibers is used, the number of variations will increase by some hundreds of orders of magnitude.

By selecting the points according to aspects of the present disclosure, it is possible to obtain some quintillions of possible combinations; thus, it is very unlikely for a counterfeiter to obtain a document with the same unique characteristics as those contained in a digital certificate produced according to aspects.

In the particular case of banknotes, even if the original manufacturer wanted to forge an exact copy of one document, it would have to manufacture many documents (in the order of quintillions) and then select one which has the same variation, and then paste the document ID data together with the same certificate of the original. Therefore, particularly for banknotes, this method using the register does not make the counterfeiting impossible, rather makes it economically unfeasible by making the counterfeiting a very complex and inefficient process.

However, to avoid an attacker statistically studying the variations of the official manufacturer, the message obtained in step (30) is then transformed in step 40 through the use of a Mathematical Hash function and then encrypted in step 60 to yield a unique digital certificate.

In step 40 of FIG. 1, the message obtained in step (30) is then transformed using a mathematical function, such as a Hash function in order to obtain a Hashed message comprising at least one chain of characters in step 50 of FIG. 1. There are some mathematical methods to run a Hash function, for example, by means of a mathematic unidirectional process or model (algorithm) delivering a chain of characters.

The Hashed function is then encrypted in step (60) to yield an encrypted hashed message or digital certificate. In order to encrypt the Hashed message, an asymmetric encryption algorithm is used that requires a private key (70) in order to generate a digital certificate (80) in the form of an encrypted alphanumeric chain.

As shown in FIG. 1, the digital certificate is, in turn, stored in a database (90) that can be kept in a server placed in secure installations, and/or it can be marked/printed (97) back to the document (10) in a readable manner by the same mechanism to obtain the data (20), such as a barcode, code or plain text (fi). When using a database (90) in addition to storing the digital certificate (80), it may also be useful to associate that digital certificate in the database with other ID data information such as the serial number of the security document, a scanned copy of the document, details on the place and time of manufacture of the document, etc.

The digital certificate is then a validation element associated to the document ID data of the security document and refers to a particular relationship between images and characters which are present in a unique way for each security document.

The digital certificate 80 acts as a barrier to an unauthorized third party with a reader who wants to read counterfeited documents or banknotes and print on them a label that represents the reader's scan according to the encryption scheme. Typically, the digital certificate (for example a bar code label or other mark) would represent a cryptogram decipherable by a public key, and the private key would be reserved for the authorized certifying party or authority. However, as mentioned, the digital certificate may not be included in the security document. As previously mentioned, the digital certificate represents the unique and unrepeatable physical characteristics of the images and characters present in a security document and will not disclose further information on how to forge a copy.

The encrypted information is then placed as a mark or printed back in step 97 of FIG. 1. The digital certificate 80 and the hashed message 50 as well as the partial hashed messages and the document ID data of the security document are stored in a database 90, placed in a server available for public access. The digital certificate in the form of an element (fi) can optionally be inserted on the security document 10.

In some aspects of the present disclosure, the digital certificate can be selected from a bar code or a bidimensional bar code element or a character string (f1).

Thus, the digital certificate 80 is the result of the unique and unrepeatable relationship between the variety of images and characters due to register, which are due their manufacturing processes, present in a security document.

Authentication Process

Figure 5:
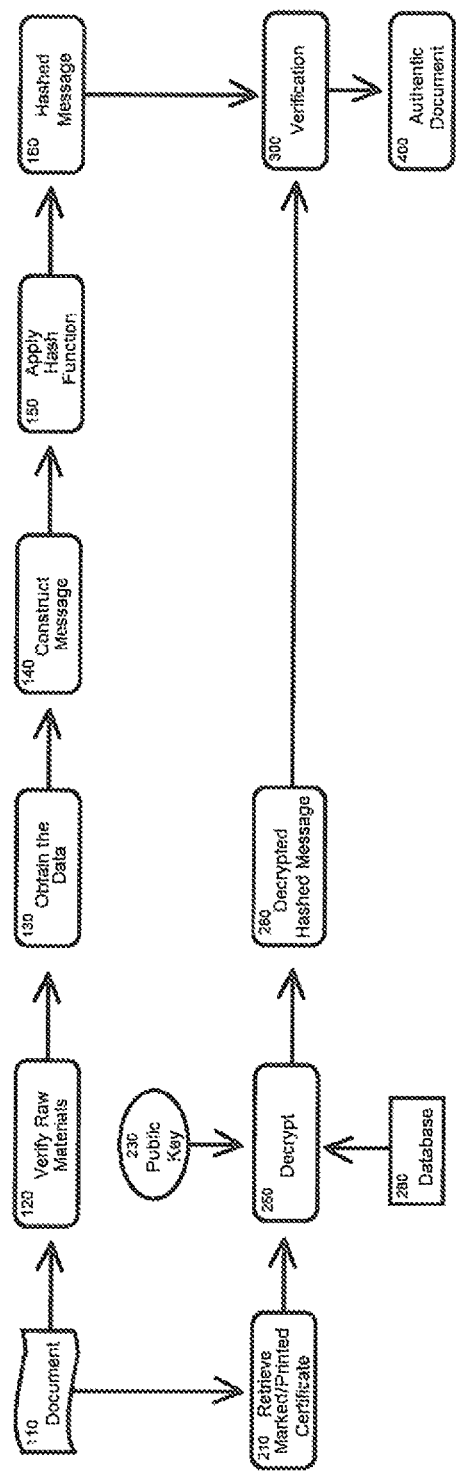
FIG. 5 is an example of an authentication process of a security document.
Figure 6:
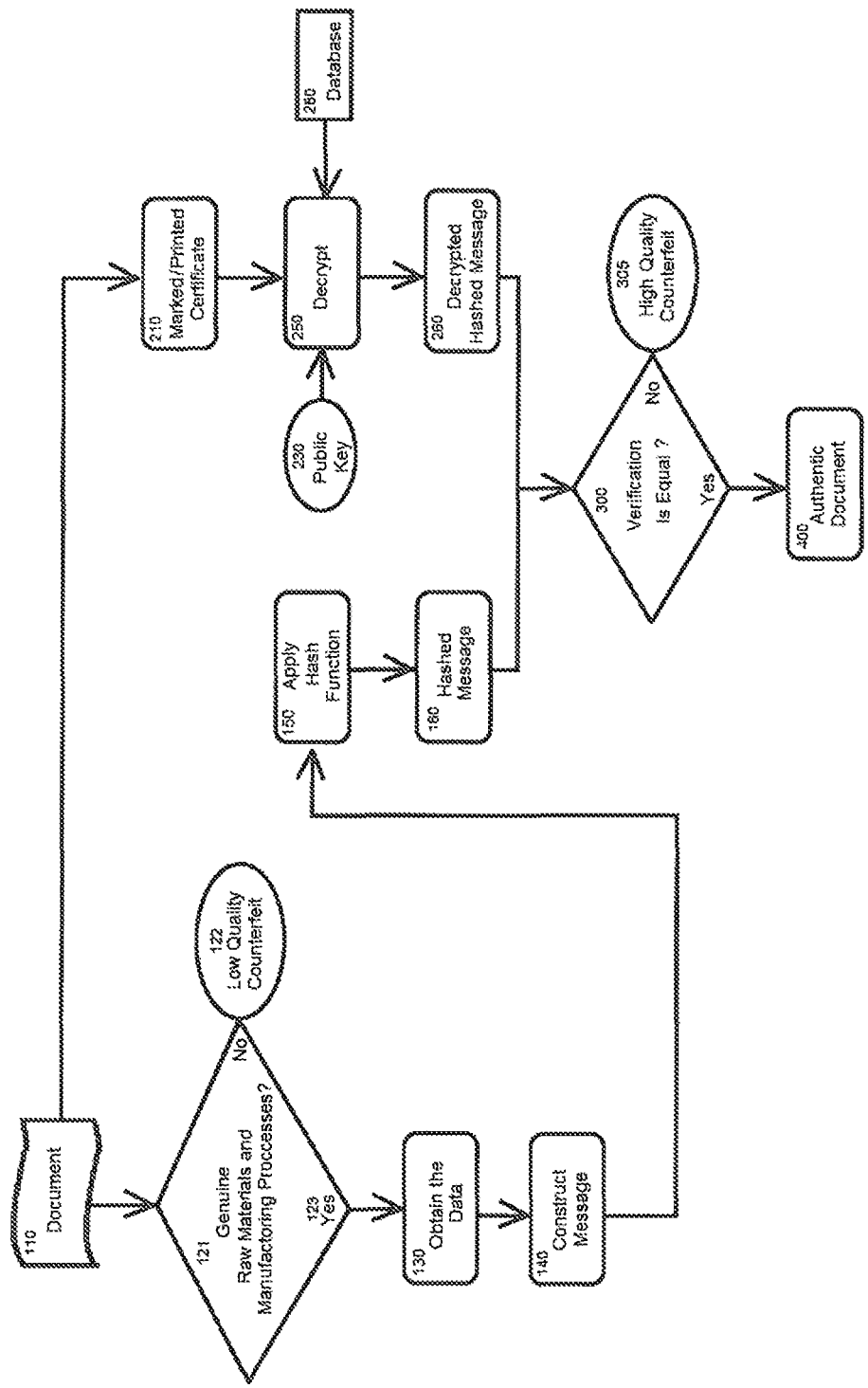
FIG. 6 is an algorithm for the authentication of a security document.

The security documents that have been certificated are subject to further authentication. The process of authentication of a security document in circulation is depicted in FIGS. 5 and 6. The authentication of a security document is a task conducted by an authentication authority, for example the authentication authority of a issuing institution, but can also be performed by both a user of the document and the authentication authority when a user wishes to authenticate a document. According to FIG. 5, a user or authentication authority that desires to know if an issued document (110) is genuine or not should first (step 120) verify the supplies and the existence of the security features (watermarks, security threads, security inks, security processes, etc.) intended to be present in a genuine document; simple photocopies and rough copies are discriminated in step 120 in FIG. 5 and step 121 in FIG. 6, and considered as low quality counterfeit (122, FIG. 6).

Then, if the raw materials and printing processes present in the document subject to authentication are considered as genuine (step 123, FIG. 6), a hashed message must be generated according to the features of the document of the user. For such purposes, the user/authentication authority must obtain the data of the security documents (step 130) by means of any device capable of taking the required digital image, then construct a message through the use of a metric function and the document ID data (step 140), and apply a hash function (150) to obtain a hashed message (160) for verification.

As a next step, the user is provided with a smart phone, tablet or a different processing device with an application able to obtain the data (130) and automatically construct the message (140) through the metric function, as well as to apply the hash function (150) to the message in order to obtain a hashed message (160) for verification.

In order to authenticate the security document, the hashed message for verification (160) is compared with a decrypted hashed message (260). The digital certificate (80, FIG. 1) to obtain the decrypted hashed message (260) needs to be retrieved in some way. One source of digital certificates (80, FIG. 1) for verification is the database (280), created during the certification. Considering the data acquisition and processing module is operable to access the database managed by the authentication authority, the digital certificate can be decrypted (250) by means of a public key (230), in order to obtain a decrypted hashed message (260). The database may be part of a mass storage device that forms part of the reader apparatus, or may be at a remote location and accessed by the reader through a telecommunications link. The telecommunications link may take any conventional form, including wireless and fixed links, and may be available over the internet. The data acquisition and processing module may be operable, at least in some operational modes, to allow the signature to be added to the database if no match is found. This facility will usually only be allowed to authorized persons, for obvious reasons. It should be noted that the misuse of the public key does not facilitate the counterfeiting of the document, since the public key is useful for decrypting the digital certificate but is useless for encrypting a hashed message.

In some aspects of the present disclosure, the hashed message for verification (160) of the security document is provided to the authentication authority, which is able to obtain the correspondent decrypted hashed message (260) from the database (280) as described above, and perform a comparison to establish whether the hashed message for verification (160) is a match with the decrypted hashed message (260).

Another source to retrieve the digital certificate (80, FIG. 1) is the bar code or a bidimensional bar code element or a character string (f1, in FIG. 2) marked/printed on the security document.

In some aspects of the present disclosure, the digital certificate can be decrypted (250) by means of a public key (230) to obtain a decrypted hashed message (260) and used to perform the comparison to establish whether the hashed message for verification (160) is a match with the decrypted hashed message (260), which can be locally performed by the user.

Finally, if the hashed message for verification (160) and the decrypted hashed message (260) are a match, the document is then qualified as an authentic document (400 in FIG. 6). On the other hand, if the hashed message for verification (160) is not a match with the corresponding decrypted hashed message (260), the document is considered as a high quality counterfeit (305). The incidence of such counterfeits may provide elements/evidence for investigating criminal patterns.

As depicted in FIG. 6, the user should first conduct a verification step 121 for the presence of the genuine raw materials and the original security manufacturing processes present in security documents, such as banknotes. If such materials and processes are not present, then the document is considered as a low quality counterfeit (122). If the expected materials and processes are in the document and are considered as genuine, then the user should conduct a step of obtaining data (130).

In some aspects of the present disclosure, the authentication process is performed through the use of an application for an intelligent device, such as a smart phone or tablet. The application guides the user to obtain an accurate image and provides the means to connect to the Authentication Authority. After the authentication by the Authentication Authority, the result of the comparison process is delivered.

The method provides the possibility of classifying counterfeits by their manufacturing characteristics; for such purposes, equipment is needed for automatic classification and registering (ID) of counterfeits, which is in charge of registering the features of all the counterfeits arriving at the issuing institution in order to create a database with all the information extracted from counterfeits, in order to statistically link pieces to "Counterfeiters" (not necessarily a person) and detect even slight improvements. Such information is useful in investigating and pursuing counterfeiting crimes.

For the certification, image acquisition systems (digital camera, scanners), image processing equipment (such as CPUs, GPUs, FPGAs), storage system (data servers) are needed. In the case of 97, the Marking/Printing device can be an inkjet printer, a numbering machine, laser marking devices, labeling devices, etc.

For authentication, image acquisition system (digital cameras, cellphone camera, scanner, etc.) image processing system (such as CPUs [PCs, Servers, Tablet, Smartphones, etc.], GPUs, FPGAs) are needed. In the case of 280: access to the database (Internet, SMS, LAN, WAN, VPN, etc.) is needed.

Aspects of the present disclosure being thus described, it will be obvious that the same these aspects may be varied in many ways.

Such variations are not to be regarded as a departure from the spirit and scope of the disclosure, and all such modifications as would be obvious to one skilled in the art are to be included within the scope of the following claims.

Acknowledgements:

The author would like to thank Mario Hernandez Téllez and Uriel Mancebo del Castillo for the numerous and useful discussions.

What is claimed is:

1. A computer-implemented method for certifying a security document, comprising:
    providing a security document which is the result of a plurality of independent manufacturing processes that provide each an image, said security document having thus a set of unique characteristics related to the use of different supplies for manufacturing the security document;
    obtaining, via the one or more processors, a digital image of the security document;
    selecting, via one or more processors, a determined set of locations in images of each of the plurality of different manufacturing processes in the document image;
    determining a reference location in an image of a manufacturing process of the plurality of different manufacturing processes;
    calculating relative positions (register data) of a location within the determined set of locations in images of each of the different manufacturing processes with respect to the reference location;
    constructing, via the one or more processors, a message from said register data measured from the determined set of locations of the document image;
    constructing, via the one or more processors, a hashed message, wherein the hashed message is obtained by encoding the message with a unidirectional cryptographic hash function;
    encrypting, via the one or more processors, the hashed message using a private key, by a public key cryptographic system, to obtain a digital certificate;
    visibly printing the digital certificate on the security document; and
    storing, via the one or more processors, the digital certificate in an external database.

2. The method for certification according to claim 1 wherein the digital image is taken with light with a wavelength between 200 and 1500 nanometers.

3. The method for certification according to claim 1 wherein the digital image is taken with visible light.

4. The method for certification according to claim 1 wherein many parts of the same document are independently certified.

5. A method for certification according to claim 1, wherein the security document is a banknote, a check, a passport, visa, ID document or birth certificate.

6. The method for certifying a security document according to claim 1, wherein the register data is obtained throughout the production line.

7. The method for certifying a security document according to claim 1, wherein the register data is obtained during quality inspection.

* * * * *